United States Patent [19]

Bitek

[11] Patent Number: 5,559,553

[45] Date of Patent: Sep. 24, 1996

[54] CLOCK CONTROL CIRCUIT WITH INDEPENDENT TIMING ADJUSTMENTS FOR IMAGE SENSING DEVICES

[75] Inventor: Alfred O. Bitek, Rochester, N.Y.

[73] Assignee: Eastman Kodak Company, Rochester, N.Y.

[21] Appl. No.: 330,484

[22] Filed: Oct. 28, 1994

[51] Int. Cl.[6] .................................................. H04N 3/14
[52] U.S. Cl. ........................ 348/312; 348/319; 348/321; 348/272
[58] Field of Search ................................... 348/222, 319, 348/321, 272, 312, 303, 294, 311; 359/215; H04N 3/14

[56] References Cited

U.S. PATENT DOCUMENTS

| | | | |
|---|---|---|---|
| 3,913,090 | 10/1975 | Fischer | 340/324 |
| 4,244,003 | 1/1981 | Poetsch et al. | 358/50 |
| 4,245,252 | 1/1981 | Nagumo | 358/213 |
| 4,472,741 | 9/1984 | Takatsu et al. | 358/213 |
| 4,498,106 | 2/1985 | Sato et al. | 358/213 |
| 4,750,042 | 6/1988 | Murayama et al. | 358/213 |
| 4,807,037 | 2/1989 | Iesaka et al. | 358/213 |
| 4,837,630 | 6/1989 | Ueda | 358/213 |
| 4,851,915 | 7/1989 | Yang et al. | 358/213 |
| 4,890,165 | 12/1989 | Hasegawa | 358/213 |
| 4,949,183 | 8/1990 | Stevens | 358/213 |
| 4,980,771 | 12/1990 | Ueda et al. | 358/213 |
| 5,040,071 | 8/1991 | Stevens | 358/213 |
| 5,063,439 | 11/1991 | Tabei | 358/41 |
| 5,086,344 | 2/1992 | D'Luna et al. | 358/213 |
| 5,144,444 | 9/1992 | MacLean | 358/209 |
| 5,196,939 | 3/1993 | Elabd et al. | 358/213 |
| 5,237,422 | 8/1993 | Kannegundla et al. | 358/213 |
| 5,272,535 | 12/1993 | Elabd | 358/213 |
| 5,287,192 | 2/1994 | Iizuka | 348/311 |

*Primary Examiner*—Safet Metjahic
*Assistant Examiner*—Glenton B. Burgess
*Attorney, Agent, or Firm*—James D. Leimbach

[57] ABSTRACT

An image sensor used to implement a system to prevent aliasing problems typically encountered in charge coupled devices where a single charge coupled device is used to sense multiple colors. The image sensor has an imaging region having a substrate of semiconductor material including that which provides for accumulation of charge. The transfer of charge carriers contained within said imaging region is performed to two horizontal shift registers located adjacent to the sensing region. The horizontal shift registers having a series of storage regions for receiving charge carriers from the sensing region. Control is provided for implementing transfer of charge carriers out of the image sensing region and into the horizontal registers. The controlled transfer of charge carriers employs multiple clocking techniques to transfer charge carriers between and out of the horizontal registers. The multiple clocking techniques employ independent timing adjustments for register loading periods and an independent timing adjustment for register readout periods. The adjustments provide for control of rise and fall time of the clock pulses in order to prevent color mixing.

11 Claims, 5 Drawing Sheets

CLOCK CONTROL CIRCUIT WITH INDEPENDENT TIMING ADJUSTMENTS FOR IMAGE SENSING DEVICES

BACKGROUND OF THE INVENTION

1. Field of the Invention

The present invention relates to solid state image sensing devices, and more particularly, to image sensing devices employing charge coupled devices with multiple horizontal shift registers.

2. Description of the Prior Art

Image sensing devices within the prior art have disclosed charge coupled device based image sensors having dual horizontal registers for loading and reading out of charge carriers stored within the charge coupled device. The prior art devices for red, green, and blue (RGB) color image sensing typically have employed independent semiconductor chips to control the storage and reading out of the charge carriers. This has been necessary in prior art devices in order to control the unintentional mixing of RGB colors due to color aliasing and, thereby, yield better color reproduction at speeds as low as 20 MHz. However, using separate semiconductor devices for sensing each RGB color creates a more expensive system.

In particular, high resolution image sensing devices complicate the above discussed problems. These high resolution devices typically operate at a data rate of 74 MHz by employing dual registers each operating at 37 MHz. The high speed requirements of these devices increase aliasing problems and make it necessary to employ techniques that eliminate color mixing to assist the separation of charge carriers representing each color. Accordingly, prior art devices typically use separate semiconductors for the image sensing of each color at these high speeds. In a three chip design aliasing problems do not exist. However, a three chip design requires very expensive optics and the lens set up requirements are very substantial.

The present invention solves shortcomings within the prior art devices that do not allow mixing of different colored signals on a signal chip.

SUMMARY OF THE INVENTION

The present invention solves shortcomings within the prior art devices that do not allow mixing of different colored signals on a signal chip, and provides the capability to employ multiple register CCD's having red, green and blue on a single device. This is accomplished by preventing the mixing of charge that represents either red, green or blue with one another resulting in superior separation of the red, green and blue colors. The result allows excellent RGB color in a single CCD device having multiple readout registers.

An electronic circuit is used to control clocks on the horizontal registers in a charge coupled device image sensor having dual horizontal registers. The electronic circuit provides independent timing adjustments for the register loading period and the register readout period by providing separate load adjustment circuitry for the two horizontal registers and separate read adjustment circuitry for each of the two horizontal registers. Additionally, control for the timing of the rising and falling edges of each horizontal register control clock is provided.

The present invention offers advantages over existing systems that employ separate chip controls for each of the three RGB colors in that it allows use of a single chip to control all three RGB colors. This has numerous cost and manufacturing advantages over embodiments requiring the use of separate chips to control the three RGB colors.

BRIEF DESCRIPTION OF THE DRAWINGS

FIG. 4b is a timing diagram for the clock generator of FIG. 4a.

FIG. 5b is a timing diagram for the clock generation scheme of FIG. 5a.

DESCRIPTION OF THE PREFERRED EMBODIMENT

Figure 1:
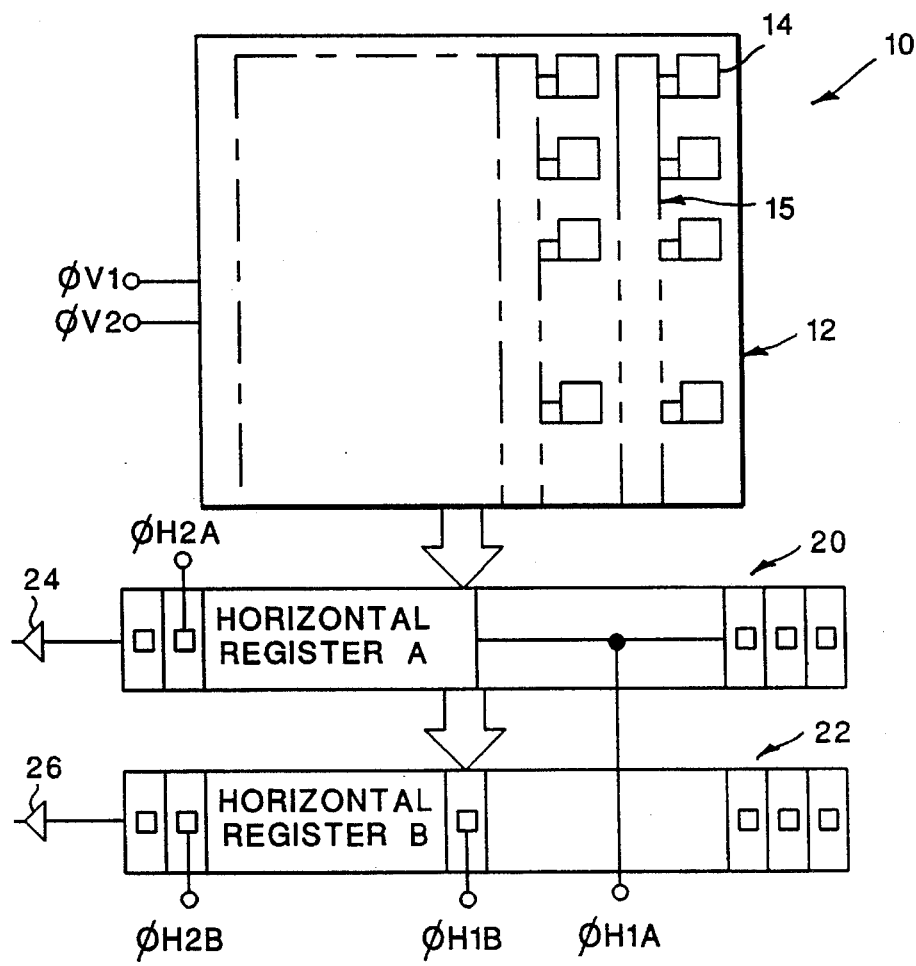
FIG. 1 is a diagram of the imaging sensing device employed by the present invention.

It has been discovered that a high speed clock control circuit can be used in imaging sensing devices in speeds having a read out rate at 37 MHz and above. Because of the high speed these image sensing devices typically have dual output registers. Referring to FIG. 1, image sensor (10) has imaging sensing region (12) containing photosensitive element (14). Immediately adjacent to imaging region (12) are a pair of horizontal registers (20) and (22). Imaging region (12) will have columns of photosensitive elements (14) attached to vertical shift registers (15). The vertical shift registers (15) shift charge pairs from photosensitive elements (14) into horizontal shift registers (20) and (22). Once the horizontal shift registers (20) and (22) are full, the charge carriers are clocked out of the horizontal shift registers (20) and (22) to output circuits via buffers (24) and (26).

Figure 4A:
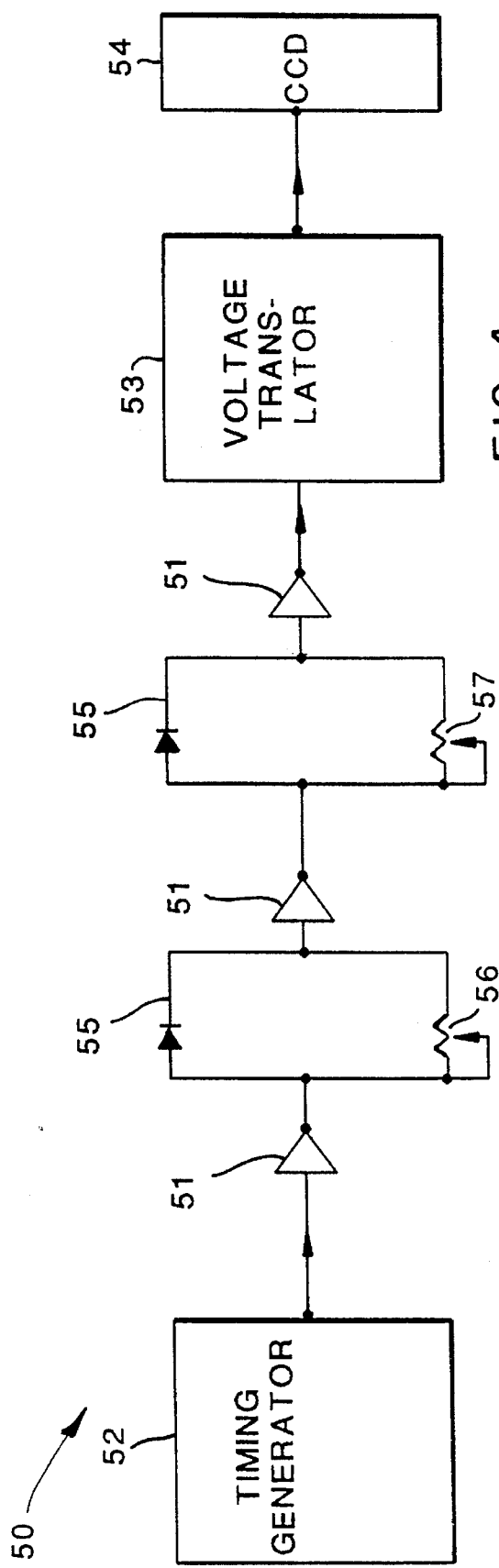
FIG. 4a is a circuit diagram of a clock generation scheme typically used within the prior art.

Because of the high speed requirements of the dual horizontal registers (20) and (22), clock signals that are applied to these registers must be carefully controlled both when the registers are loaded one line at a time which occurs during the horizontal blanking interval and when the registers are read out one pixel at a time during the active line time. Prior art circuits particularly offered adjustments to clocking signals to horizontal shift registers such as those shown in FIG. 4a. However, these adjustments typically adjust both the horizontal shift register loading and the horizontal shift register readout. Prior art devices such as those shown in FIG. 4a are limited in that they require an individual chip for every color sensed in order to prevent the mixing of charge carriers representative of different colors. In a three chip design aliasing problems do not exist. However, a three chip design requires very expensive optics and the setup requirements for optical lenses are substantial. The present invention overcomes the shortcoming of the prior devices in that it does not allow mixing of the different color signals representative of different colors such as red, green and blue on a single chip and it provides the capability to include multiple registers, CCD devices on a single device. The circuit disclosed by the present invention prevents charge mixing of red, green and blue signals and allows excellent RGB images to be obtained for the high definition television sensor of the preferred embodiment.

Still referring to FIG. 1, the image sensing device (10) is controlled by horizontal and vertical clocks. The vertical clock signals V1 and V2 respectively (16) and (17), control the vertical shifting of charge carriers from the photosensitive elements (14) into the horizontal registers (20) and (22). The horizontal clocks of the present invention H1A, H2A, H1B and H2B, (respectively 31, 32, 33 and 34), control the loading and reading out of horizontal registers (20) and (22). In the preferred embodiment a high definition television (HDTV) sensor in which a two-field interlaced image having 1080 lines and 1920 pixels per line is read out from the image sensor (10) every 1/30 of a second. Within these parameters a new line of the image is transferred from the vertical shift register (15) to the dual horizontal registers (20) and (22) approximately every 25 microseconds. Dual horizontal registers are used so that the horizontal clock rate for each register is about 37 MHz as compared to employing a single register design in which a 74 MHz clock would be required. While employing dual registers may allow the horizontal clock to be half that of a single register architecture, a dual register architecture employing a 37 MHz horizontal clock frequency still requires that the timing relationships between the horizontal clocks be tightly controlled to within a few nanoseconds.

Precise control of the horizontal clocks is particularly critical during the horizontal blanking interval when charge is transferred from the vertical registers (15) into the two horizontal registers (20) and (22). The A horizontal register (20) is loaded with the even columns from image sensor (10) while the B horizontal register (22) is loaded with the odd column. Within the preferred embodiment image sensor (10) is a high definition television sensor having been fabricated with green stripe filters covering the even columns and alternate red and blue stripe filters covering the odd numbered columns. Referring to FIG. 3 which is a timing diagram for the clocking scheme employed within the present invention, clocks must be carefully controlled to within 2 or 3 nanoseconds otherwise charge will not properly be transferred into the horizontal (20) and (22) registers from the vertical register (15). It should be understood that the fall times for clocks H1A (31) and H2A (32) must be carefully controlled within 2 or 3 nanoseconds. If this is not accomplished the red, green and blue signals will mix together and cannot thereafter be separated. It should further be noted that within the preferred embodiment certain controls exist to the clock pulse as shown in FIG. 3. Specifically, at the time interval indicated at t2 (42) in FIG. 2, clock H1A (31) may have a falling edge occurring 2 to 3 nanoseconds before the falling edge of clock H1B (33). However, H1A (31) must not have a falling edge that occurs after the falling edge of H1B 33). This is indicated as the time period t3 (43). This situation exists for loading the horizontal registers. However, during the readout of the horizontal registers (20) and (22), it is preferable to have both falling edges occur simultaneously. Therefore different constraints are placed on the timing relationships of the clocks during blanking intervals when a line of charge is transferred to the horizontal registers (20) and (22) as compared to when the active line time occurs when the pixel data is read out from the horizontal registers one after another.

Figure 2:
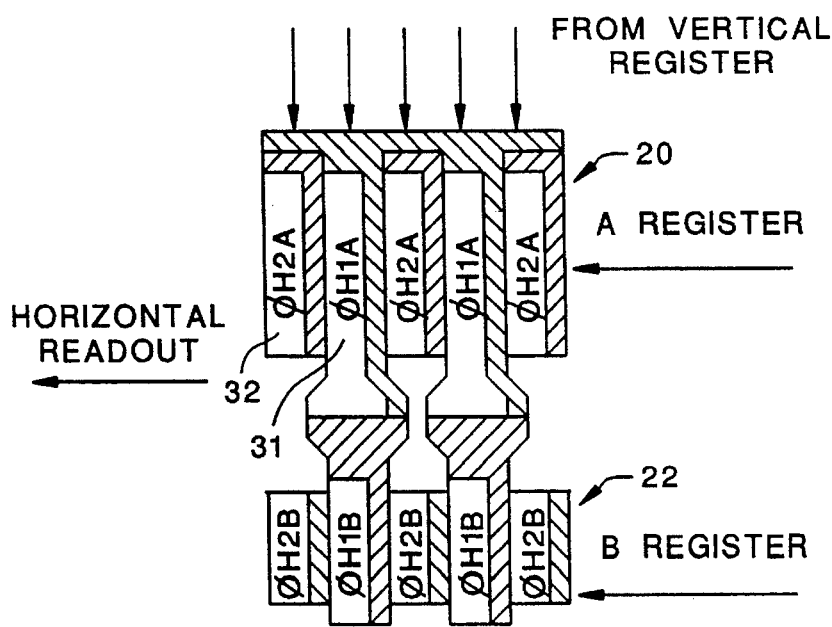
FIG. 2 is a diagram illustrating the means used to transfer charge between the horizontal registers of the present invention.
Figure 3:
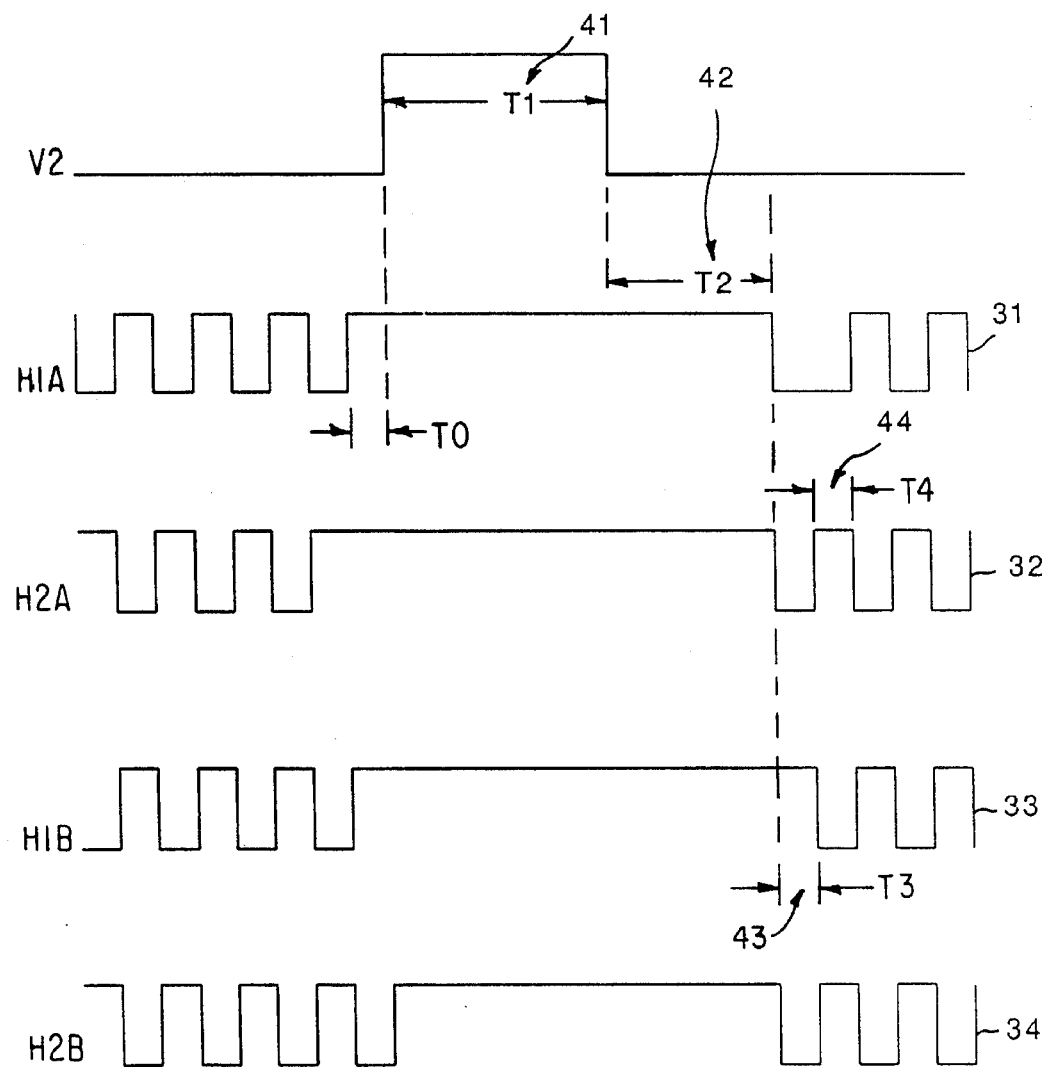
FIG. 3 is a timing diagram for the clock generator used within the present invention.

Referring to FIG. 2, which illustrates the path charge will take to transfer between horizontal registers, in conjunction with FIG. 3, the sensor device (10) has a column by column transfer from vertical shift registers (15) into horizontal registers (20) and (22). Every other column will be transferred into either horizontal register A (20) or horizontal register B (22). The A register (20) will transfer the charges from the even numbered vertical columns and the B horizontal register will transfer the charge carriers from the odd numbered vertical columns. Special timing considerations must be adhered to in transferring charge between the A and B horizontal registers (20) and (22). As can be seen in FIG. 3, the time period T0 is the time period in which both the H1A (31) and the H2A (32) clocks are high. A high state on both of these clocks is required before charge can be transferred from the vertical shift register (15) into the horizontal register A (20). Keeping these two clock pulses high during this period prevents charge from flowing laterally from one phase across to previous and sequential phases. Referring to period t2 in FIG. 3, clocks H1A (31) and H2A (32) must go from a high potential to a low potential at the same time. If the H1A clock (31) goes from a high potential to a low potential in a time greater than 3 nanoseconds prior, the transition of the H2A (32) clock transition from a high potential to a low potential, charge will flow laterally across the A horizontal register and the two vertical columns in the vertical shift register scheme (15) will mix and not transfer properly into the B horizontal register (22). If H2A clock (32) goes from a high potential to a low potential 3 nanoseconds, or more, prior to the transition of H1A clock (31) transition from a high potential to a low potential then a situation exists in which all the charge from both the A phases will transfer into the B horizontal register 22.

Still referring to FIG. 3, the H1B clock 33 provides the potential voltage to shift charge from the A horizontal register 20 into the B horizontal register 22. The H2B clock 34 functions to transfer the pixels out of the B horizontal register. However, the timing of the B horizontal register 22 has no effect on the color aliasing problem and therefore the timing of the B horizontal register is not critical to the prevention of color mixing.

Referring now to FIG. 4a in conjunction with 4b, a prior art timing adjustment circuit (50) is shown wherein timing generator (52) produces signal (60) that functions as a clock for CCD (54). There are three inverters (51) between timing generator (52) and voltage translator (53) making the signal received by timing generator (52) the inverse of the signal transmitted by timing generator (52). Adjustment circuits (55) are responsible for adjusting the load timing (58) and the readout timing (59) within signal (60). The circuit (50) of FIG. 4a has the basic problem that any change by either of adjustment circuits (55) will result in a change in both the readout timing (59) as well as the load timing (58).

Figure 5A:
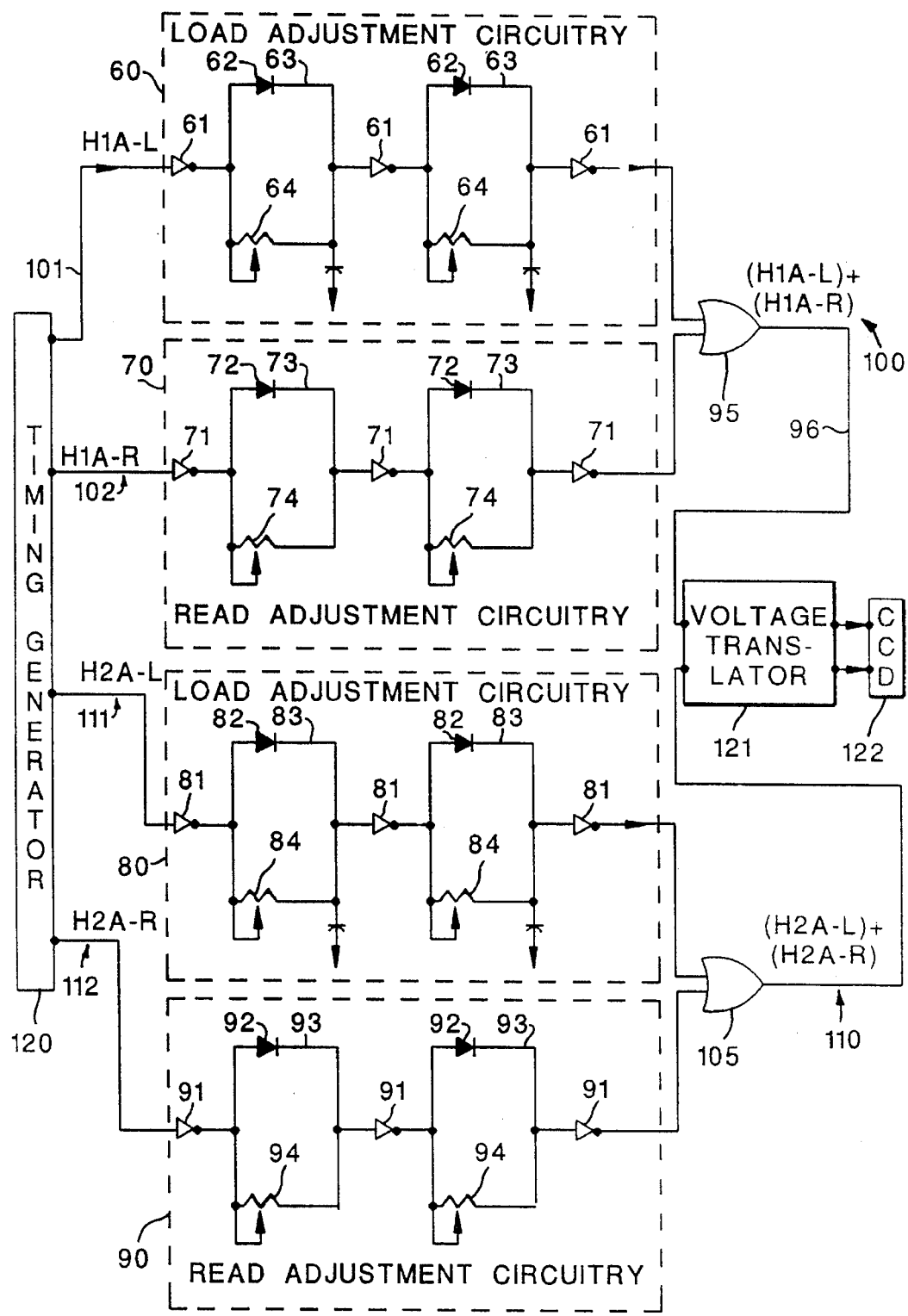
FIG. 5a is the clock generation scheme employed by the present invention.

Referring now to FIG. 5a is a circuit diagram of the clock timing adjustments of the present invention. As can be seen, there are duplicate load timing adjustments (60, 80) for each of the two clocks. There are also separate read timing adjustments (70, 90) for each of the two clocks. Each of the adjustments (60, 70, 80, 90) are essentially identical to the adjustment circuitry found in FIG. 4a. However, duplicating the adjustments for the clocks makes it possible to separately adjust the readout timing and the load timing for each of the clocks. This requires four individual circuits. Additionally, for a dual register design as in the present invention, the entire four adjustment circuits (60, 70, 80 and 90) of FIG. 5a must again be duplicated (not shown) for the second horizontal register, thereby, making the total number of independent circuits required to be eight. While these eight circuits require more space and expense than the circuit of FIG. 3a, this is easily outweighed by the advantages of using only a single image sensing device as offered by the present invention.

Figure 4B:
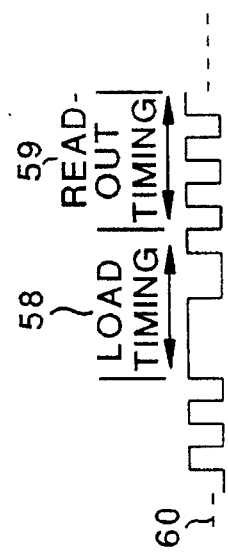
Figure 5B:
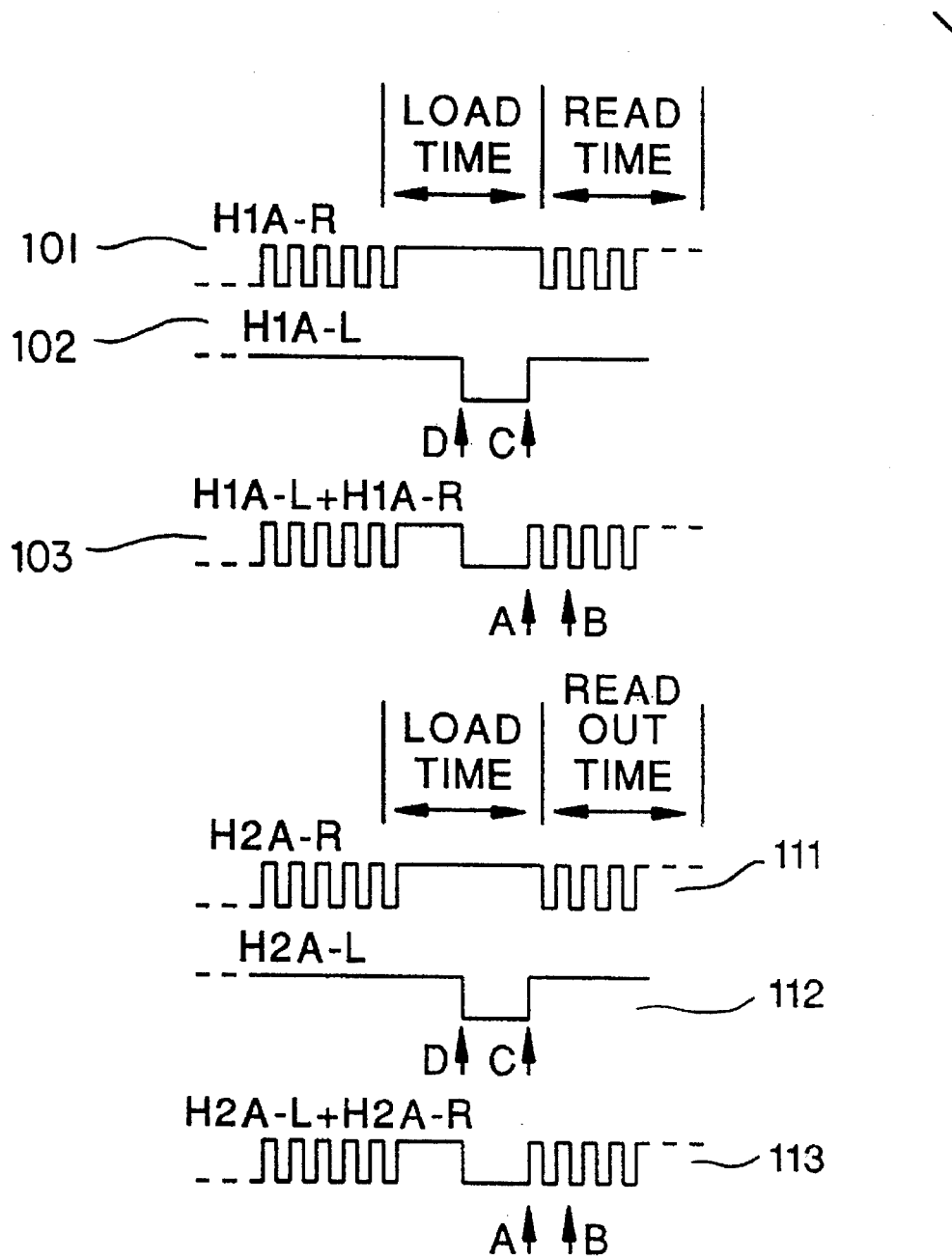

Referring now to FIG. 4b in conjunction with FIG. 4a, timing generator (120) generates clocks H1A-L, H1A-R, H2A-L, and H2A-R (respectively 101, 102, 111 and 112) to be applied to CCD device (122). Timing diagrams for the clocks (101, 102, 111 and 112) are shown in FIG. 5b as they exist when output from timing transmitter (120). Each of these clocks will pass through three inverters and two timing adjustment circuits prior to being logically combined by OR gates (95, 105). The signals that are input into OR gates (95, 105) are therefore opposite in polarity from the unadjusted signal emitted from timing generator (120). Therefore, the ORing of the signals has the same Boolean logical result as if the original signals had passed through a NAND gate according to DeMorgans theorem as shown in Equation 1.

Equation 1 $\bar{A}+\bar{B}=\overline{A*B}$

Thus, the output of OR gates (95, 105) result in being each a logical NAND of the signals output by timing generator (120) which are adjusted as desired by timing adjustment circuitry (60, 70, 80 and 90), and three times inverted prior being input into OR gates (95, 105). The output of OR gates (95, 105) is then input into voltage translator (121) where it again has the polarity reversed. The resulting signal input to CCD (122) then results as a logical AND of the original signals output by timing generator (120). This logical combination as apparent in FIG. 5b as (H1A-L)+(H1A-L) (103), provides the ability to keep either of the clocks generated by timing generator (120) high and allowing the other gated clock to operate the horizontal register of CCD (122).

The description of the preferred embodiment discusses the most preferred manner of using the present invention. It should be understood that numerous variations will be obvious to those skilled within the relevant art and that these obvious modifications are included by the scope of the invention as determined by the appended claims.

| Parts List | |
|---|---|
| 10 | image sensor |
| 12 | imaging region |
| 14 | photosensitive elements |
| 15 | vertical shift registers |
| 16 | vertical clock signal V1 |
| 17 | vertical clock signal V2 |
| 20 | 1st horizontal register A |
| 21 | storage cells A |
| 22 | 2nd horizontal register B |
| 23 | storage cells B |
| 24 | buffer amp #1 |
| 26 | buffer amp #2 |
| 31 | clock H1A |
| 32 | clock H2A |
| 33 | clock H1B |
| 34 | clock H2B |
| 41 | t1 in FIG. 1 |
| 42 | t2 in FIG. 2 |
| 43 | t3 in FIG. 2 |
| 44 | t4 in FIG. 2 |
| 50 | prior art timing circuit |
| 51 | inventors |
| 52 | timing generator |
| 53 | voltage translator |
| 54 | CCD |
| 55 | adjustment circuits |
| 56 | R1 |
| 57 | R2 |
| 58 | load timing |
| 59 | readout timing |
| 60 | load timing adjustments |
| 61 | inventors |

-continued

| Parts List | |
|---|---|
| 62 | diode |
| 70 | read timing adjustment |
| 71 | inventor |
| 72 | diode |
| 80 | load timing adjustments |
| 90 | read timing adjustment |
| 95 | OR gate |
| 101 | clock H1A-L |
| 102 | clock H1A-R |
| 103 | (H1A-L) + (H1A-L) |
| 105 | OR gate |
| 111 | clock H2A-L |
| 112 | clock H2A-R |
| 120 | timing generator |
| 121 | voltage translator |
| 122 | CCD device |

I claim:

1. An image sensing system comprising:

an imaging region having a substrate of semiconductor material including means for accumulation and transfer of charge carriers contained within said imaging region;

at least two shift registers located adjacent to said region, said shift registers having a series of storage regions for receiving said charge carriers from said region;

first control means for implementing transfer of charge carriers out of said region into one of said registers;

second control means for transferring charge carriers out of said one of said registers; and multiple clocking means responsive to said second control means for transferring charge carriers out of each of said registers, said multiple clocking means having independent timing adjustment means for controlling register loading periods and for controlling register readout periods for each of said shift registers by adjusting when rising and falling edges of the multiple clocking means occur.

2. The invention of claim 1 further comprising said independent timing adjustments for register loading and readout periods having independent clock controls for controlling rise time and fall time of the horizontal clock signals both during horizontal blanking interval and active read out time.

3. The invention of claim 1 wherein said independent timing adjustments further comprises a separate load and read adjustment circuitry for each of two said registers.

4. The invention of claim 1 wherein said multiple clocking means further comprises means for combining two of said independent timing adjustment means for purposes of controlling both data rates and line rates independently.

5. The invention of claim 1 where said multiple clock means further comprises preprocessing means for said independent timing adjustment means for preventing color mixing within the at least two registers.

6. A method of preventing the mixing of colors within an image sensing device comprising the steps of:

sensing multiple colors of light with an imaging sensing device having a photosensitive region with a substrate of semiconductor material including means for accumulation of charge carriers, means for transfer of charge carriers contained within said imaging region, and at least two shift registers located adjacent to said region, said shift registers having a series of storage regions for receiving said charge carriers from said region;

transferring charge carriers out of said region into one of said registers;

generating a plurality of clocking signals from a plurality of clocks having independent timing adjustments for loading of said registers, said plurality of clocks having independent timing adjustments for loading and reading out of charge carriers stored in each of said registers by adjusting when rising and falling edges of the plurality of clocking signals occur; and applying said plurality of clocks to said registers to facilitate transfer charge carriers out of said one of said registers into the other of said registers.

7. The method of claim 6 wherein the step of transferring charge carriers out of said region further comprises transferring odd lines into one of said registers and even lines into another of said registers.

8. The method of claim 6 wherein the step of transferring further comprises transferring charge carriers under control of separate clocks for odd and even lines.

9. The method of claim 6 wherein the step of generating said plurality of clocking signals further comprises generating said plurality of clocks such that rise time and fall time of horizontal clock signals have independent timing adjustments operative both during horizontal blanking interval and active read out time.

10. The method of claim 6 wherein the step of generating said plurality of clocking signals further comprises combining clocking signals derived using independent timing adjustments such that data rates and line rates can be independently controlled.

11. The method of claim 6 wherein the step of generating said plurality of clocking signals further comprises the step of preprocessing said independent timing adjustments of said clocks to prevent color mixing within said two registers.

* * * * *